(12) United States Patent
Gonzalez Martin et al.

(10) Patent No.: US 11,366,454 B2
(45) Date of Patent: Jun. 21, 2022

(54) GENERATING A PREVIEW OF A PART TO BE PRINTED

(71) Applicant: HEWLETT-PACKARD DEVELOPMENT COMPANY, L.P., Spring, TX (US)

(72) Inventors: Sergio Gonzalez Martin, Sant Cugat del Valles (ES); Alex Carruesco Llorens, Sant Cugat del Valles (ES); Arturo Domingo Millan, Sant Cugat del Valles (ES); Matthew A. Shepherd, Columbia, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/051,559

(22) PCT Filed: Aug. 20, 2018

(86) PCT No.: PCT/US2018/047111
§ 371 (c)(1),
(2) Date: Oct. 29, 2020

(87) PCT Pub. No.: WO2020/040729
PCT Pub. Date: Feb. 27, 2020

(65) Prior Publication Data
US 2021/0232118 A1  Jul. 29, 2021

(51) Int. Cl.
*G05B 19/4099* (2006.01)
*B33Y 50/00* (2015.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC ...... G05B 19/4099; G05B 2219/35134; G05B 2219/49023; B29C 64/386; B33Y 50/00;
(Continued)

(56) References Cited

U.S. PATENT DOCUMENTS 5,079,699 A * 1/1992 Tuy .................. G06T 17/00
345/424
6,167,150 A * 12/2000 Michael ............... G06K 9/4638
348/125
(Continued)

FOREIGN PATENT DOCUMENTS

EP        3013563         5/2016
KR     20180088089       8/2018
(Continued)

OTHER PUBLICATIONS

De Editors, "3MF Format for 3D Printing: What it is, How to Use it", Article, Jun. 1, 2018, Digital Engineering, <www.digitalengineering247.com>.

*Primary Examiner* — Thomas C Lee
*Assistant Examiner* — Michael Tang
(74) *Attorney, Agent, or Firm* — HP Inc. Patent Department

(57) ABSTRACT

In one example, a representation of a volume of a part to be printed by an additive manufacturing system is generated, where the representation depicts a plurality of voxels. A plurality of slices of the representation are generated. Each slice relates to a plurality of voxels within a first plane. A first process is performed in respect of a slice of the plurality of slices, wherein in the first process at least one voxel that has a predetermined colour and is located on a predetermined surface of the part is identified and a data file is updated to include data representative of the identified at least one voxel. The first process is repeated in respect of another slice. A three-dimensional preview of the part to be printed is generated based on the data file.

20 Claims, 4 Drawing Sheets

(51) Int. Cl.
*B29C 64/386* (2017.01)
*G06T 15/08* (2011.01)

(52) U.S. Cl.
CPC .... *G06T 15/08* (2013.01); *G05B 2219/35134* (2013.01); *G05B 2219/49023* (2013.01)

(58) Field of Classification Search
CPC ......... B33Y 10/00; B33Y 30/00; G06T 15/08; G06T 19/00; G06T 2219/008; G06T 17/00; Y02P 10/25; B22F 10/30
See application file for complete search history.

(56) References Cited

U.S. PATENT DOCUMENTS

| | | |
|---|---|---|
| 6,940,507 B2 | 9/2005 | Repin |
| 8,780,390 B2 | 7/2014 | Seto |
| 8,836,757 B2 | 9/2014 | Jang |
| 9,916,684 B2 | 3/2018 | Goel |
| 10,460,508 B2 * | 10/2019 | Zhan .................. G06T 7/11 |
| 11,104,169 B2 * | 8/2021 | Kritchman ............ B33Y 50/00 |
| 2012/0065755 A1 | 3/2012 | Steingart |
| 2013/0124151 A1 | 5/2013 | Mech |
| 2015/0029187 A1 * | 1/2015 | Nakamura ............ G06T 19/20 345/420 |
| 2015/0351467 A1 * | 12/2015 | Simoes ................ A41D 13/08 700/98 |
| 2017/0372513 A1 * | 12/2017 | Zeng ..................... G06T 17/00 |
| 2018/0056640 A1 | 3/2018 | Yoshida |
| 2018/0117849 A1 * | 5/2018 | Brunton .............. B29C 64/393 |
| 2018/0240263 A1 * | 8/2018 | Courter ............... G06T 15/503 |
| 2019/0279371 A1 * | 9/2019 | Usikov ................ G06K 9/6202 |
| 2020/0043220 A1 * | 2/2020 | Mishaev ................ G06T 1/20 |

FOREIGN PATENT DOCUMENTS

| | | | |
|---|---|---|---|
| WO | WO-2016171649 A1 | 10/2016 | |
| WO | WO-2017071764 A1 * | 5/2017 | ............ G06T 17/00 |
| WO | WO-2020005211 A1 | 1/2020 | |

* cited by examiner

GENERATING A PREVIEW OF A PART TO BE PRINTED

BACKGROUND

A print file defines content to be printed by a printing device. The print file is provided to a printing device, which performs printing in accordance with the print file. In an additive manufacturing system, such as a three-dimensional (3D) printing system, the print file may define a part to be printed in terms of at least one of the following: size, shape, material, texture, and colour.

BRIEF DESCRIPTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
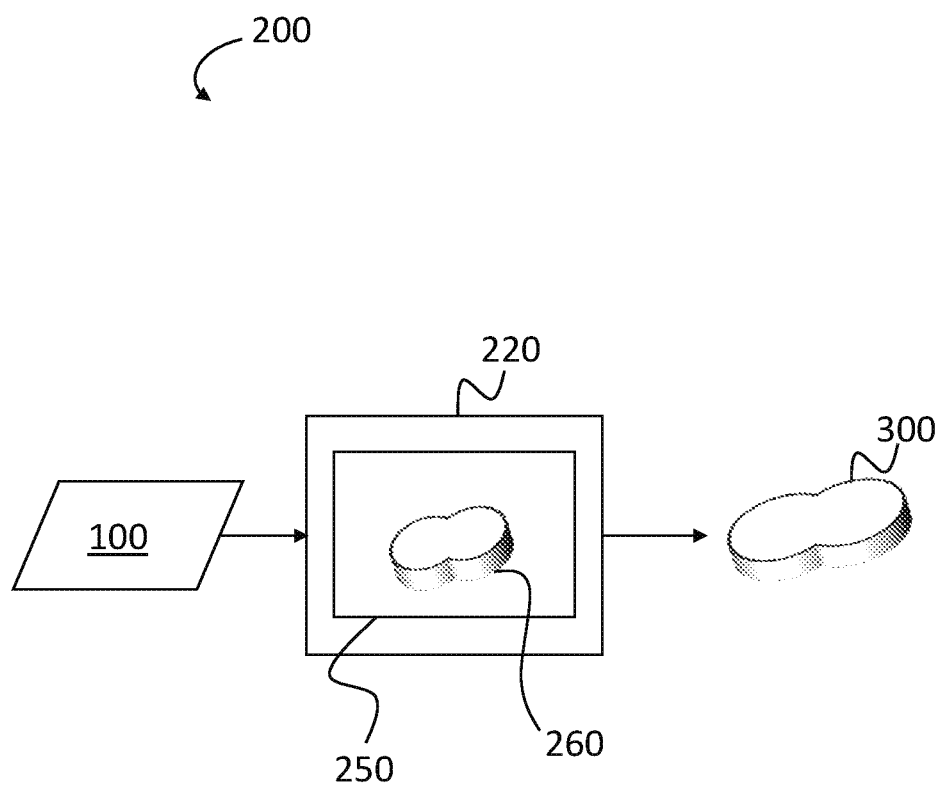
FIG. 1 is a schematic illustration of a 3D printing system, according to an example.

Three-dimensional objects can be generated using additive manufacturing techniques. The objects may be generated by solidifying portions of successive layers of build material. The build material can be powder-based or powder-like, and the material properties of generated objects may be dependent on the type of build material and the nature of the solidification process. In some examples, solidification of the powder material is enabled using a liquid fusing agent. In other examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to melt, fuse, sinter, coalesce, or otherwise solidify. In other examples, other build materials and other methods of solidification may be used. In certain examples, the build material may be in the form of a paste or a slurry.

Examples of build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide (e.g., nylon), thermo (setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, and plastics/ceramics blends. There exist more build materials and blends of build materials that can be managed by an apparatus of this disclosure and that are not mentioned in this disclosure.

A three-dimensional object can be generated by a 3D printer based on a specification defined within a print file. An object may be formed from one or more parts. The print file allows a part to be represented using a mesh formed from geometrical shapes, such as polygons. A colour or texture image may be assigned to the surface of the geometrical shapes. In an example, the print file may be in a 3MF file format.

The print file may define a number of specifications of the part to be printed, such as material, size, shape, texture and colour. The granularity of each of the specifications can vary from a general definition applied to the whole of a part to a specific definition applied to a portion of a polygon of the part.

For colour, in one example, the print file may define a solid colour per part, whereby a single colour is assigned to the whole part in question. Alternatively, the print file may define a colour per geometrical shape defining the part, for example, per polygon or per triangle. In another example, the print file may define colour per vertex of the geometrical shape. In the latter case, there are different ways to define the colour, which may be used alone or in combination with one another. In one example, the colour per vertex definition may assign a different colour, for example a different sRGB colour, to each vertex to achieve a gradient of colours within the geometrical shape. In a further example, each vertex may have two coordinates (u, v) identifying a portion of a colour or image (also referred to as a "texture") to be mapped to the vertex.

In addition, the print file may define required features (classified as "MUST" features in the 3MF format) and non-required features (classified as "SHOULD", "RECOMMENDED", or "MAY" features in the 3MF format).

In one example, a required "MUST" feature may be that each edge of a geometric shape, for example a triangle, shares common vertexes with one other geometric shape, so effectively every edge within the geometric mesh is shared by two geometric shapes of the mesh. This way, holes or open mesh structures are avoided.

The non-required features may or may not be incorporated in the printed part, and this can depend on how the printer interprets the print file. As an example, a non-required feature may be the application of a correctional or editing function to the data of the print file, such as a gamma correction or use of a specific filter. In some examples, the correctional or editing function may result in a change to the colour of the printed part, or a portion thereof. In another example, a non-required "SHOULD" feature may be that all of the geometric shapes should have a non-zero area to avoid numerical instabilities while calculating a normal specification of the geometric shapes.

In example 3D printing systems, the print file is provided to a computer application, for example, a software application, that translates the print file into printing instructions for a 3D printer of the system.

In some systems, the print file includes an embedded 2D preview, for example, a 2D thumbnail, of a part to be printed using the print file, where the thumbnail may be displayed to a user before the part is printed. In some cases, the 3D printer has a display for displaying the 2D thumbnail to a user. In addition, a single 2D thumbnail is often used to represent the appearance of the whole part. However, providing a thumbnail to a user in this way has a limitation in that the 2D thumbnail is static and shows a single perspective of the part, resulting in a restricted preview.

In addition, such a preview is generated before the print file is provided to the printer, giving rise to inconsistencies between the preview and a part printed by the printer in accordance with the print file due to how the printer reads the print file. As an example, the print file may define recommended features or processes, which are not essential to be incorporated into the printed part, and consequently may not be incorporated by the printer. In an example, a pre-generated preview inserted into the print file would not reflect that a printer is not going to produce a recommended feature in a part and, thus, the preview would not accurately portray the appearance of a part printed by the printer in accordance with the print file. In one example, a recommended but not mandatory feature may relate to the surface colour of the part. An inaccurate preview may result in user dissatisfaction with the printed part.

In some examples, validation of colour of the part is carried out by simulating a printing operation and inspecting preview images of layers in the XY plane; however, this does not provide previews of surfaces that are not coplanar to the XY plane. In other examples, where a 3D printer is generated by an application implemented external to the printer, for example by a remote computer, a user may depend upon the remote computer and application executing thereon having the capability to support the print file. In such cases, the remote computer may support all the properties that may be defined by the print file, such as colour properties, texture mapping, and colour blending. However, providing a remote computer and an external application with such support is complex and computationally expensive.

Accordingly, to avoid these issues an example method for generating a preview of a part to be printed, as described herein, provides a way of generating a preview that is an accurate representation of how the part would be printed by the printer.

An example method comprises generating a representation of a volume of a part to be printed by an additive manufacturing system, wherein the representation depicts a plurality of voxels; generating a plurality of slices of the representation, wherein each slice relates to a plurality of voxels within a first plane; performing a first process in respect of a slice of the plurality of slices, the first process comprising: identifying at least one voxel that has a predetermined colour and is located on a predetermined surface of the part; and updating a data file to include data representative of the identified at least one voxel; repeating the first process in respect of another slice; and generating a three-dimensional preview of the part to be printed based on the data file.

A predetermined surface may correspond to one or more of the following: an internal or inner surface of the printed part; an external or outer surface of the printed part; and any surface visible when the part is in printed form, whereby a visible surface may be an external or an internal surface and may be categorized as "visible" if the surface may be seen from at least one external viewpoint of the part. An external viewpoint of the part may be regarded as a user viewpoint of the part. For example, a visible surface of a printed part may be viewed at least once within a 360 degree rotatable view of the part. In other words, a predetermined surface may correspond to a perimeter surface or perimeter region of a printed part, whereby the perimeter surface may be regarded as an internal or external surface of the printed part depending on how the part is shaped. In one example, a perimeter or a perimeter region of a part may comprise a region of a part within a threshold distance from the outermost surface of the part, whereby the threshold distance may be changeable from part to part.

As another example, if a printed part is a hollow hemisphere the printed part would have an outer hemisphere surface and an inner hemisphere surface both visible to a user from at least one viewpoint, that is a viewpoint external to the part itself. In such a case, the outer and inner hemisphere surfaces may be regarded as perimeter surfaces of the printed part in question, whereby the predetermined surface may correspond to the outer surface of the hemisphere and the inner surface of the hemisphere. In this scenario, the example method would generate a three-dimensional preview that allows a user to validate the colour of the visible outer hemisphere surface and the visible inner hemisphere surface.

A three-dimensional preview may be a preview of a part displayed on a 2D screen but depicting depth of the part such that the preview represents the appearance of the part in 3D. The 3D preview may be such that display of the preview may be manipulated in such a way to change a viewpoint of the preview resulting in the preview representing the appearance of the part in 3D from a different angle or perspective. In one example, display of the 3D preview may provide a 360 degree rotatable viewpoint of the printed part.

FIG. 1 is a schematic illustration of a 3D printing system 200. The system 200 has a 3D printing device 220.

The printing device 220 is controllable to receive a print file 100 that contains data defining a part to be printed by the printing device 220. The printing device 220 is controllable to process the data of the print file 100 to produce a 3D preview of the part, such as preview 260, rendered on a display 250 of the printing device 220. In response to the preview 260 being deemed acceptable, for example through receipt, by the printing device 220, of user validation of the preview, the printing device 200 is controllable to print a part 300 in accordance with the print file 100. As an example, the print file 100 may be a 3MF file. The part 300 of FIG. 1 is an example printed part. In other examples, the print file may be such that it results in a printed part having one or more structures such as: openings, bumps, holes, and cavities, whereby a preview of would be generated to represent each surface visible to a user in a corresponding printed part. In this way, a user can validate each surface, external and/or internal, visible in the printed part.

Figure 2:
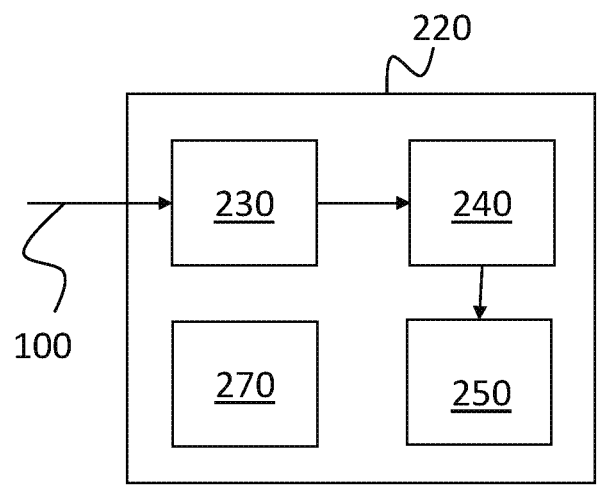
FIG. 2 is a schematic illustration of the 3D printing device of FIG. 1, according to an example.

FIG. 2 is a schematic illustration of the 3D printing device 220 of FIG. 1. The printing device 220 has an interface 230, a processor 240, a display 250, a memory 270, and printing components and circuitry (not shown) that perform the printing.

The print file 100 is received by the interface 230 and forwarded to the processor 240 so that the data of the print file 100 can be processed. In more detail, the processor 240 acts as a central processing unit of the printing device 220 and is configured to execute a program, such as a computer program or software application stored in the memory 270, to interpret the data of the print file 100. The display 250 is controllable to display a 3D preview of the part to be printed in accordance with the interpretation of the data of the print file 100 by the program executed by the processor 240. In some examples, the processor 240 may be configured to request user validation of a 3D preview prior to causing printing of the part. For instance, the processor 240 may control the display 250 to display a user validation request and receive a response to the request, whereby in response to receiving user validation the processor 240 effects printing of the part.

In another example, the 3D printing device 220 may be in communication with a user device, for example, a mobile device of the user, such that the 3D preview is transmitted to the user device for validation.

Figure 3:
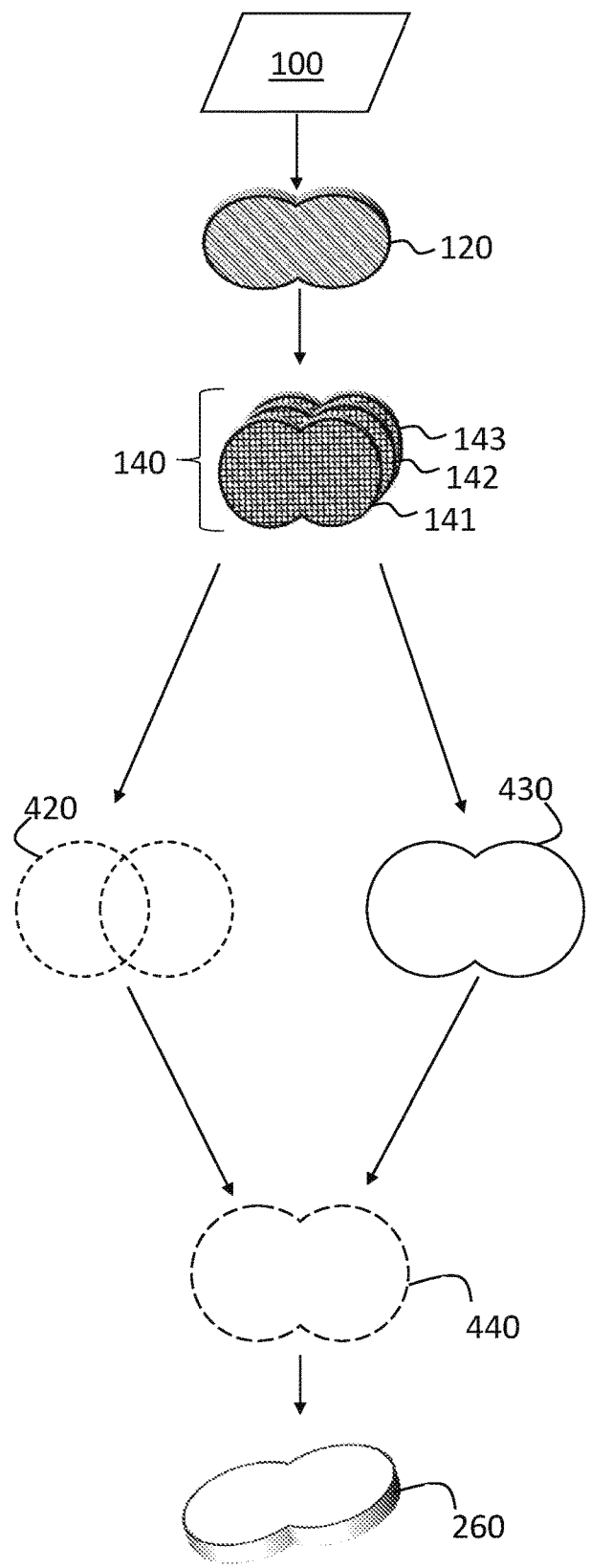
FIG. 3 is a schematic illustration of generating a 3D preview from a print file, according to an example.

FIG. 3 is a schematic illustration of generating a 3D preview from a print file, such as the print file 100. The operations illustrated by FIG. 3 are carried out by a program executed by the processor 240.

The print file 100 defines the part to be printed in terms of a plurality of geometric shapes, such as triangles. As can be seen from FIG. 1, in this example the part defined by the print file 100, printed part 300, is a solid part with an outline shape corresponding to two overlapping circles. The geometric shapes are converted into a volumetric representation 120 representative of a plurality of voxels of a voxel model or voxelization, such that the representation 120 is generated based on printing data of the print file 100. In one example, the print file 100 defines a printing resolution as a voxel resolution. In some instances, the volumetric representation 120 is generated using the same voxel resolution as that defined in the print file 100, this way, the 3D preview resulting from the representation 120 will be an accurate depiction of a part printed in accordance with the print file 100. The geometric shapes are converted by applying a transformation matrix such as an affine 3D transformation matrix. The volumetric representation 120 can be defined by a variety of properties. For example: a shape property that can be used to determine whether a voxel within the voxel model relates to the volumetric representation 120 and therefore should or should not be printed; a shell property that can be used to determine if a voxel of the voxel model relates to the surface of the representation 120; a colour property that provides colour information on each voxel represented by the representation 120; and a normal property that provides information on a vector normal to each voxel represented on the surface of the representation 120.

The volume representation 120 is divided into a plurality of slices 140 containing a first slice 141, a second slice 142, and a third slice 143, where each slice relates to a plurality of voxels (depicted by the grid lines) within a first plane. In one example, the slices are generated along the Z axis of the representation 120, such that the plurality of voxels related to each slice are in the XY plane.

For a selected slice, such as the second slice 142, a colour property of each voxel related to the slice is determined and a representation of the determined colour property is generated as a 2D image, such as, image 420, where the presence of a predetermined colour in the slice 142 is depicted by a dashed line. As an example, the predetermined colour may correspond to at least one colour representable by the print file, specifically, representable by the colour space of associated with format of the given print file. For the same slice 142, a surface or shell property of each of the plurality of voxels related to the slice is determined and a representation of the determined shell property is generated as a 2D image, such as, image 430, whereby voxels represented on a predetermined surface of the slice are depicted by a solid line. In this example, for slice 142, the predetermined surface is the outer surface because this particular surface will be visible in a part printed from the print file 100, as depicted by the printed part 300 of FIG. 1. Accordingly, the solid outline of image 430 represents the outer surface of the slice 142. In a related example, for slice 141 a predetermined surface may correspond to a visible surface in a printed part in which case the image 430 would be completely filled in because slice 141 represents a top surface of the part to be printed and would therefore be completely visible in a part printed from print file 100, as depicted by printed part 300 of FIG. 1.

Returning to the slice 142, using both images 420, 430 a plurality of voxels related to the slice 142 having a predetermined colour and located on a predetermined surface visible in a part printed from the file 100 can be identified. As an example, this can be depicted by a further 2D image, such as image 440 that illustrates an amalgamation of the images 420 and 430, which represents a subset of voxels (depicted by the dashed line) containing the predetermined colour and located at an outer surface of the part. As such, image 440 represents reduced colour data because colour data of voxels not represented on the outer surface of the slice 142 (represented by the internal dashed lines in image 420) is not included.

Following the identification, data representative of the identified voxels is inputted to a data file for viewing a preview of the part. In one example, the inputting of the data representative of the identified voxels to the data file involves the determination of x-y coordinates for the identified voxels within the reduced colour image 440 and the determination of a z coordinate based on the position of the slice 142. The x, y, and z coordinates are used to define the content of the data file. In one example, the data file may comprise a point cloud. In one example, the data of the data file may be stored using a PLY format for point clouds. The point cloud may then be rendered on a display, for example, the display 250 of the printing device 220, to generate a 3D colour preview of the part to be printed.

The remaining slices of the plurality of slices 140 are processed in the same way as the slice 142 and the data file is updated to contain data corresponding to each.

In one example, the image 420 representing the colour property of the relevant slice can be downscaled by means of a downscaling factor, thereby generating a low resolution preview. This effectively reduces the amount of colour data within the image 420 and also the data file. The downscaling may average the colour property corresponding to a predefined number of neighboring voxels. As an example, the image 420 may be downscaled using a factor of 4 so that the colour property corresponding to four neighboring voxels is averaged. As an example, downscaling the image 420 by a factor of 4 corresponds to dividing a printing resolution in the XY plane by a factor of 4, whereby a printing resolution of 600 voxels per inch, vpi, would be downscaled to a printing resolution of 150 voxels per inch. Put another way, a voxel in a downscaled image having a printing resolution of 150 voxels per inch is generated using 4×4 voxels in the original 600 vpi image.

In one example, the image 430 may be downscaled in a similar way as image 420 whereby the surface property may be averaged for a predefined number of neighboring voxels. The downscaling of one or both of images 420 and 430 may occur before image 440 is generated. In another example, the image 440 may be downscaled, either as an alternative or in addition to downscaling of images 420 and 430.

In one example, the processing described in relation to FIG. 3 is implemented for a subset of the plurality of slices representing the volumetric representation 120. The subset may be defined by a downscaling factor, n, whereby the aforementioned processing is implemented for every nth slice of the plurality of slices. As such, the downscaling operates on the printing resolution in the Z plane. In one example, if a downscaling factor of 4 is applied to an original printing resolution of 80 microns per voxel, the downscaling factor is used as a multiplier resulting in a slice of 320 microns per voxel, in order for a processed slice to correspond to the voxel properties in the Z plane of the disregarded slices (that did not correspond to every nth slice).

Figure 4:
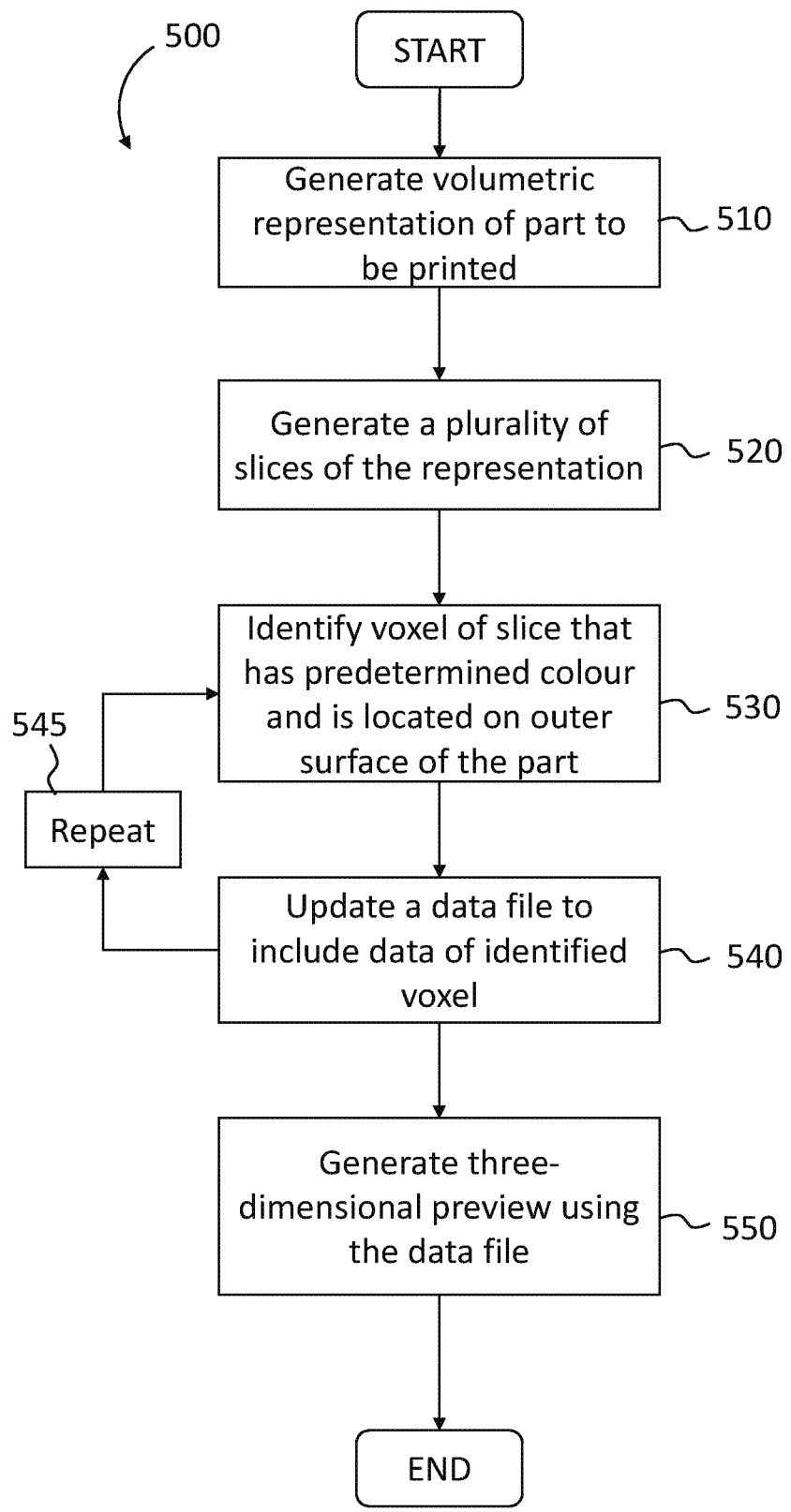
FIG. 4 is a flowchart illustrating a method of generating a 3D preview of a part to be printed, according to an example.

FIG. 4 is a flowchart illustrating a method 500 of generating a 3D colour preview of a part to be printed. At 510, a volumetric representation of a part to be printed is generated, where the representation is formed of a plurality of voxels. Next, at block 520 a plurality of slices of the representation are generated. Each slice is formed of a plurality of voxels within a plane perpendicular to the slicing direction, for example perpendicular to the Z axis of the representation. In some scenarios, where a part to be generated comprises empty space, the print file may define isolated volumes within the part. In such a scenario, the volumetric representation represents the empty space and, consequently, one or more slices of the volumetric representation corresponding to the empty space would not comprise any voxels. These slices would be ignored in the method 500.

At block 530, for a first slice of the plurality of slices, at least one voxel of the plurality of voxels that has a predetermined colour and is located on a predetermined surface of the part is identified. Next, at block 540 a data file is updated to include data representative of the identified at least one voxel. Thereafter, at block 545 the identification of block 530 and the updating of block 540 are repeated for another slice of the plurality of slices until a predetermined number of slices, in some examples all slices, have been processed.

Finally, at block 550, a three-dimensional preview of the part to be printed is generated using the data file.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A computer-implemented method comprising
   generating a representation of a volume of a part to be printed by an additive manufacturing system, wherein the representation depicts a plurality of voxels;
   generating a plurality of slices of the representation, wherein each slice relates to a plurality of voxels within a first plane;
   performing a first process in respect of a slice of the plurality of slices, the first process comprising:
      identifying at least one voxel that has a predetermined colour and is located on a predetermined surface of the part; and
      updating a data file to include data representative of the identified at least one voxel;
   repeating the first process in respect of another slice;
   generating a three-dimensional preview of the part to be printed based on the data file containing data representative of the specific identified voxels;
   displaying the three-dimensional preview for user validation; and
   upon receiving user validation, printing the part.

2. The computer-implemented method of claim 1, the first process comprising:
   determining at least one colour property of each of the plurality of voxels related to the slice;
   determining at least one surface property of each of the plurality of voxels related to the slice; and
   identifying, a subset of voxels containing colour and located at a predetermined surface of the part.

3. The computer-implemented method of claim 2, the first process comprising:
   generating a 2D image representative of the colour properties of the slice; and
   generating a 2D image representative of the surface properties of the slice.

4. The computer-implemented method of claim 1, comprising:
   applying a downscale factor, such that the first process is repeated in accordance with the downscale factor.

5. The computer-implemented method of claim 4, wherein applying the downscale factor comprises averaging a color property of a number of neighboring voxels based on the downscale factor.

6. The computer-implemented method of claim 1, wherein the data file comprises a point cloud.

7. The computer-implemented method of claim 6, comprising:
   receiving a print file comprising the printing data.

8. The computer-implemented method of claim 7, wherein the print file is a 3MF print file.

9. The computer-implemented method of claim 1, wherein the method is implemented by a printer of an additive manufacturing system.

10. The computer-implemented method of claim 1, wherein a file defining the part to be printed comprises data for part features classified as "must," "should," "recommended," and "may."

11. The computer-implemented method of claim 10, wherein the preview indicates how a printer generating the representation of a volume of the part has interpreted the classified features.

12. The computer-implemented method of claim 1, further comprising generating additional previews such that each surface of the part that is visible to a user is included in one of the previews.

13. The computer-implemented method of claim 1, wherein a voxel resolution is defined by a printing resolution of a corresponding printer.

14. An additive manufacturing system controllable to produce a part based on printing data, the additive manufacturing system comprising a processor, the processor configured to:
   receive printing data defining a part to be printed by the additive manufacturing system, wherein the printing data defines a volumetric representation of the part;
   divide the volumetric representation into a plurality of layers, each layer corresponding to an array of voxels;
   for each layer, extract data relating to at least one voxel located on a perimeter of the layer, wherein the at least one voxel has a predetermined colour;
   input the extracted data into a data file; and
   generate a three-dimensional preview of the part to be printed using the data file; and
   a display, wherein the display is controllable to:
   display the three-dimensional preview for user validation; and
   receive user validation;
   wherein in response to receipt of user validation, the processor is configured to effect printing of the part.

15. The additive manufacturing system of claim 14, wherein the processor is configured to:
   determine at least one colour property of each voxel of the array of voxels corresponding to the layer;
   determine at least one surface property of each voxel of the array of voxels corresponding to the layer; and identify, a subset of voxels containing colour and located at a perimeter of the part.

16. The additive manufacturing system of claim 15, wherein the processor is configured to:
generate a 2D image representative of the colour properties of the slice; and
generate a 2D image representative of the surface properties of the slice.

17. The additive manufacturing system of claim 14, wherein the processor is configured to:
apply a downscale factor to the 2D image representative of the colour properties.

18. The additive manufacturing system of claim 17, wherein the processor is further configured to apply the downscale factor by averaging a color property of a number of neighboring voxels based on the downscale factor.

19. The additive manufacturing system of claim 14, wherein the printing data defining the part to be printed comprises features classified as "must," "should," "recommended," and "may;" and generating the preview comprises illustrating how the system has interpreted the features of the part based on the feature classifications.

20. A non-transitory computer readable medium comprising instructions that when executed by a processor, cause the processor to:
receive a print file defining a part to be printed;
generate a plurality of 2D slices representing the part to be printed, based on print file, wherein each slice corresponds to a plurality of voxels in a single plane defining a section of the part to be printed;
for each slice, update a preview file with data representative of one or more voxels of a predetermined colour and located at a perimeter of the part to be printed;
generate a three-dimensional preview based on the preview file;
displaying the three-dimensional preview for user validation; and
upon receiving user validation, printing the part.

* * * * *